United States Patent
Kang et al.

(10) Patent No.: US 10,664,589 B2
(45) Date of Patent: May 26, 2020

(54) MEMORY ALIGNMENT RANDOMIZATION METHOD FOR MITIGATION OF HEAP EXPLOIT

(71) Applicant: Korea Advanced Institute of Science and Technology, Daejeon (KR)

(72) Inventors: Brent ByungHoon Kang, Daejeon (KR); Daehee Jang, Daejeon (KR); Minsu Kim, Daejeon (KR); Jonghwan Kim, Daejeon (KR); Daegyeong Kim, Daejeon (KR); Hojoon Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 124 days.

(21) Appl. No.: 15/485,868

(22) Filed: Apr. 12, 2017

(65) Prior Publication Data

US 2018/0157827 A1   Jun. 7, 2018

(30) Foreign Application Priority Data

Dec. 1, 2016 (KR) .................. 10-2016-0162888

(51) Int. Cl.
*G06F 12/14* (2006.01)
*G06F 12/00* (2006.01)
*G06F 21/52* (2013.01)
*G06F 21/57* (2013.01)
*H04L 29/06* (2006.01)

(52) U.S. Cl.
CPC ............. *G06F 21/52* (2013.01); *G06F 12/00* (2013.01); *G06F 12/14* (2013.01); *G06F 21/577* (2013.01); *G06F 2221/033* (2013.01); *H04L 63/14* (2013.01)

(58) Field of Classification Search
CPC .............. G06F 12/00; G06F 12/14; G06F 2212/25–26; G06F 2212/70–72; H04L 63/14

See application file for complete search history.

(56) References Cited

U.S. PATENT DOCUMENTS

| 7,546,430 | B1* | 6/2009 | Miller | G06F 12/1408 711/163 |
| 10,191,791 | B2* | 1/2019 | Stark | G06F 12/14 |
| 10,528,737 | B2* | 1/2020 | Zuckerbraun | G06F 9/50 |
| 2006/0010304 | A1* | 1/2006 | Homewood | G06F 9/30032 711/201 |

(Continued)

FOREIGN PATENT DOCUMENTS

KR   10-1445634   10/2014

OTHER PUBLICATIONS

English Language Abstract of KK 10-1445634 published Oct. 6, 2014.

*Primary Examiner* — Daniel B Potratz
*Assistant Examiner* — D'Arcy Winston Straub
(74) *Attorney, Agent, or Firm* — DLA Piper LLP US

(57) ABSTRACT

A memory alignment randomization method of a memory heap exploit is provided, memory alignment of objects inside a heap area is randomly performed to mitigate the exploits of the vulnerability of the software memory heap area The heap exploit is powerfully mitigated by aligning randomly obtained memory addresses instead of aligning memory addresses at multiples of 4 or 8 when the memory alignment for the objects inside the heap area.

4 Claims, 21 Drawing Sheets

(56) References Cited

U.S. PATENT DOCUMENTS

2007/0234297 A1* 10/2007 Zorn .................. G06F 11/3612
717/124
2016/0092675 A1* 3/2016 Vidrine .................. G06F 21/52
726/22

* cited by examiner

FIG. 2

```
Data: size
Result: chunk pointer
Pointer = malloc(size + sizeof(void*));
S = policy(Pointer, size);
if S then
    Displacement = random() % sizeof(void*);
    return Pointer + Displacement;
else
    return Point;
end
```

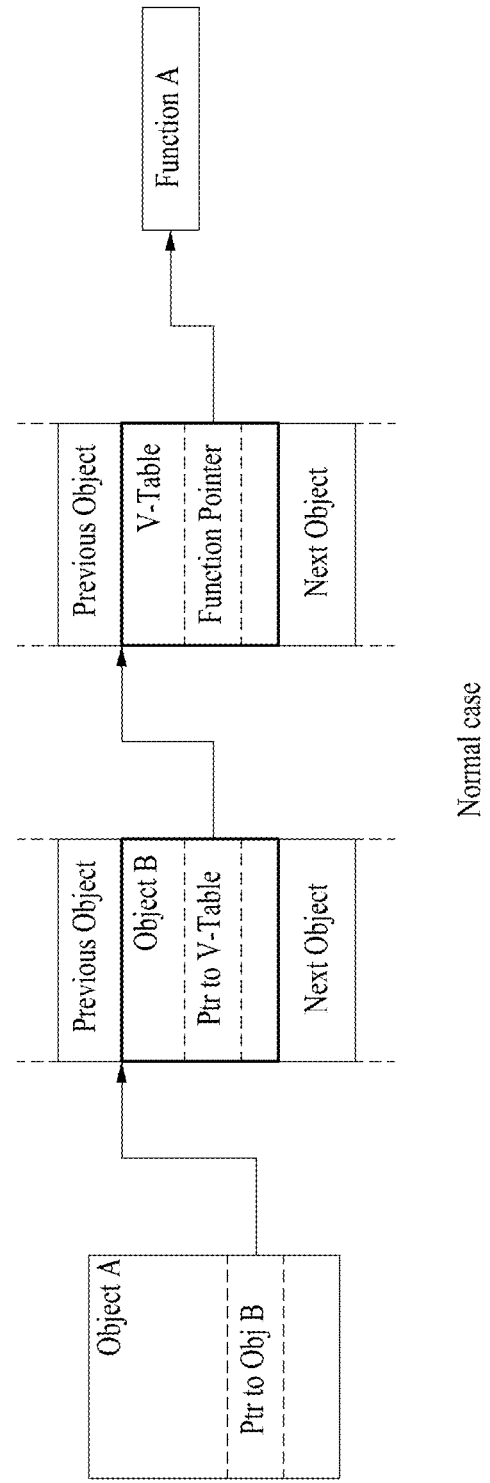

| | | |
|---|---|---|
| mshtm1.dll : 74CE67EB | | |
| mshtm1.dll : 74CE67EB | nop | |
| mshtm1.dll : 74CE67EC | nop | |
| mshtm1.dll : 74CE67ED | nop | |
| mshtm1.dll : 74CE67ED | nop | |
| mshtm1.dll : 74CE67EF | nop | |
| mshtm1.dll : 74CE67E0 | test | byte ptr [eax+9], 10h |
| mshtm1.dll : 74CE67E4 | push | esi |
| mshtm1.dll : 74CE67F5 | jnz | loc_74C92F22 |
| mshtm1.dll : 74CE67FB | mov | esi, [eax] |
| mshtm1.dll : 74CE67FD | test | esi, esi |
| mshtm1.dll : 74CE67FF | jz | loc_74C92F22 |
| mshtm1.dll : 74CE6805 | mov | eax, [esi] |
| mshtm1.dll : 74CE6807 | mov | ecx, esi |
| mshtm1.dll : 74CE6809 | call | dword ptr [eax+170h] |

UNKNOWN  74CE6805: mshtm1.dll : mshtm1_RunHTMLApplication+66077

EAX 047C1288
EBX 020BF6E7
ECX 047BCA78
EDX 00000048
ESI FECA0000
EDI 020BF66B

Microsoft.InternetE alloc : 002a7b1a,
free new pointer!
free new pointer!
alloc : 047c128a,
alloc : 047c78ca,
alloc : 047c13c0,
alloc : 047c1428,
alloc : 047c142a,
free new pointer!
free new pointer!
free new pointer!
free new pointer!
free new pointer!

Hex View-1

| 047C1278 | 00 | 00 | 00 | 00 | 00 | 00 | 00 | 00 | 00 | 06 | 99 | 36 | 48 | 00 | 00 | 00 |
| --- | --- | --- | --- | --- | --- | --- | --- | --- | --- | --- | --- | --- | --- | --- | --- | --- |
| 047C1288 | 00 | 00 | FE | BA | BE | CA | FE | BA | BE | CA | FE | BA | BE | CA | FE | BA |
| 047C1298 | BE | CA | FE | BA | BE | CA | FE | BA | BE | CA | FE | BA | BE | CA | FE | |

FIG. 8

| Instruction | Configuration |
|---|---|
| MOVB | 24 unrolled read / 24 unrolled write |
| MOVW | 24 unrolled read / 24 unrolled write |
| MOVL | 24 unrolled read / 24 unrolled write |
| MOVQ | 24 unrolled read / 24 unrolled write |
| REP STOSB | ECX:256 |
| REP STOSW | ECX:256 |
| REP STOSL | ECX:256 |
| REP STOSQ | ECX:256 |
| REP MOVSB | ECX:256 |
| REP MOVSW | ECX:256 |
| REP MOVSL | ECX:256 |
| REP MOVSQ | ECX:256 |

FIG. 10

| Instruction | Average penalty Formula | Result (p) |
|---|---|---|
| MOVB | $p = \dfrac{1\%*4096+50\%*0+2500\%*0}{4096}$ | 1.0% |
| MOVW | $p = \dfrac{1\%*4031+50\%*64+2500\%*1}{4096}$ | 2.3% |
| MOVL | $p = \dfrac{1\%*3901+50\%*192+2500\%*3}{4096}$ | 5.1% |
| MOVQ | $p = \dfrac{1\%*3641+50\%*448+2500\%*7}{4096}$ | 10.6% |

FIG. 11

| CPU | OS | Compiler | Penalty |
|---|---|---|---|
| Intel i7-5820 | Windows 10 64bit | Visual Studio 2012 (Win32,Release) | 2% |
| Intel i7-5820 | Windows 10 64bit | Visual Studio 2012 (Win32,Release) | 5% |
| Intel i7-4980 | Windows 8.1 64bit | Visual Studio 2012 (Win32,Release) | less than 1% |
| Intel i7-4980 | Windows 8.1 64bit | Visual Studio 2010 (x64,Release) | less than 1% |
| Intel i7-4980 | Ubuntu 14.04 64bit | GCC 4.8.1 (-m32) | 20% |
| Intel i7-4980 | Ubuntu 14.04 64bit | GCC 4.8.1 (default) | less than 1% |
| Intel i7-4980 | Ubuntu 14.04 64bit | GCC 4.8.1 (-m32 -static) | 10% |
| Intel i7-4980 | Ubuntu 14.04 64bit | GCC 4.8.1 (-static) | less than 1% |
| Intel i7-4980 | OSX El Capitan 64bit | LLVM 7.3 (default) | 5% |
| Intel i7-4980 | OSX El Capitan 64bit | LLVM 7.3 (-m32) | less than 1% |
| Intel i5-3570 | Ubuntu15.04 64bit | GCC 4.9.2 (default) | less than 1% |
| Intel i5-3570 | Fedora20 64bit | GCC 4.8.2 (default) | less than 1% |
| Intel i5-3570 | Debian7.5 64bit | GCC 4.7.2 (default) | less than 1% |
| Intel i5-3570 | FreeBSD9.1 32bit | GCC 4.2.1 (default) | 100% |
| Intel i5-3317 | Windows 7 64bit | Visual Studio 2012 (Win32,Release) | 5% |
| Intel i5-760 | Ubuntu 12.04 Server 64bit | GCC 4.6.3 (-m32) | less than 1% |
| Intel i5-760 | Ubuntu 12.04 Server 64bit | GCC 4.6.3 (default) | less than 1% |
| Intel i5-760 | Windows 7 64bit | Visual Studio 2010 (Win32,Release) | 50% |
| Intel i5-760 | Windows 7 64bit | Visual Studio 2010 (x64,Release) | less than 1% |
| Intel Core2Duo | OSX El Capitan 64bit | GCC 4.2.1 (-m32) | 10% |
| Intel Core2Duo | OSX El Capitan 64bit | GCC 4.2.1 (default) | 5% |
| AMD Turion 64 | Windows XP 32bit | Visual Studio 2010 (Win32,Release) | 30% |

FIG. 12

| Benchmarks (w/o AB) | Ref | Run Time | Ratio | Benchmarks (w AB) | Ref | Run Time | Ratio |
|---|---|---|---|---|---|---|---|
| peribench | 9770 | 187.89 | 41.8 | peribench | 9770 | 190.98 | 41.8 |
| bzip2 | 9650 | 313.64 | 28.1 | bzip2 | 9650 | 315.29 | 28.1 |
| gcc | 8050 | 166.84 | 37.2 | gcc | 8050 | 167.27 | 37.2 |
| mcf | 9120 | 161.70 | 8.48 | mcf | 9120 | 163.01 | 6.94 |
| gobmk | 10490 | 319.24 | 30.7 | gobmk | 10490 | 319.37 | 30.7 |
| hmmer | 9330 | 256.39 | 28.9 | hmmer | 9330 | 292.88 | 28.9 |
| sjeng | 12100 | 339.39 | 32.0 | sjeng | 12100 | 340.04 | 31.2 |
| libquantum | 20720 | 220.06 | 101 | libquantum | 20720 | 220.53 | 101 |
| h264ref | 22130 | 364.71 | 55.5 | h264ref | 22130 | 364.88 | 55.5 |
| omnetpp | 6250 | 215.76 | 23.6 | omnetpp | 6250 | 221.13 | 18.2 |
| astar | 7020 | 281.54 | 20.2 | astar | 7020 | 282.47 | 20.1 |
| xatancbmk | 6900 | 140.00 | 35.7 | xatancbmk | 6900 | 144.29 | 34.9 |

FIG. 13

|  | SunSpider (total time) |
|---|---|
| IE8 jscript9.dll without Align-Breaker | 3038 ms |
| IE8 jscript9.dll with Align-Breaker | 3062 ms | ic low fragmentation heap added since Windows 8. In
MEMORY ALIGNMENT RANDOMIZATION METHOD FOR MITIGATION OF HEAP EXPLOIT

CROSS-REFERENCE TO RELATED APPLICATIONS

A claim for priority under 35 U.S.C. § 119 is made to Korean Patent Application No. 10-2016-0162888 filed on Dec. 1, 2016, in the Korean Intellectual Property Office, the entire contents of which are hereby incorporated by reference.

BACKGROUND

Embodiments of the inventive concept described herein relate to memory alignment randomization methods of memory heap exploits, and more particularly, relate to methods of randomly performing memory alignment of objects inside heap areas (heap memory) to mitigate the exploits of the vulnerability of software memory heap areas.

According to a 2016 database of MITRE which is a SW security assessment agency under the U.S. Department of Homeland Security, 30% of the latest software exploits occur through a heap area in a memory. Software exploits are the most important techniques for distributing malicious codes, and are fields that the majority of security experts and system hackers are most interested in. Recently, various exploit mitigation techniques, which prevent hackers from performing heap exploits, have been discussed in the academic world and have been introduced to a relevant market. Representative examples may be Isolation Heap added to Microsoft Internet Explorer from 2014 and Non-deterministic low fragmentation heap added since Windows 8. In addition, similar techniques have been developed with respect to even Adobe Flash, Google Chrome, and the like.

Among the exploit mitigation techniques, a technique, in which the form of a memory is randomly changed whenever a program runs, is most frequently used. In the academic world, many precedent studies and researches have been performed on randomly changing memory positions of objects inside heap areas and relevant techniques have been developed. However, until now, all studies and researches, and all techniques have been concentrated in randomly forming the distance between objects inside a heap area and relative positions between the objects inside the heap area. That is to say, in conventional studies and researches, even if memory positions of the objects are randomly formed, start memory addresses of the relevant objects are aligned based on a central processing unit (CPU) configuration (aligned at multiples of 4 in the case of a 32-bit CPU or aligned at multiples of 8 in the case of a 64-bit CPU).

This is because the granularity of a bus line allowing the CPU to access a memory is granularity having multiples of 4 or 8 bytes instead of 1-byte granularity. Accordingly, the CPU has represented the optimal performance when the CPU accesses a memory address aligned at the multiple of 4 or 8. Intel's technical documents in the past have stated that unaligned memory access may doubly slow down the access speed to a memory of a CPU. Since then, there has never been suggested a mitigation technique of aligning a memory in a random manner instead of a manner of aligning the memory at multiples of 4 or 8 in the past studies and researches. However, recently, a technique of preventing the performance degradation has been applied to an Intel CISC micro-architecture. Accordingly, the inventive concept shows that memory alignment randomization may be an effective mitigation technology of a heap exploit.

As the prior art, there is Korean Patent Registration No. 1445634.

SUMMARY

Embodiments of the inventive concept provide memory alignment randomization methods for mitigation of heap exploits, capable of powerfully mitigating the heap exploits by aligning randomly obtained memory addresses instead of aligning the memory addresses at multiples of 4 or 8 when the memory alignment is performed with respect to objects inside a heap area.

According to an aspect of an embodiment, a method of randomizing memory alignment includes providing a size of a memory (an allocation-requested memory size), which is to be allocated, to a heap allocator and requesting a heap allocator to allocate the memory in which an object is to be positioned, returning, by the heap allocator, a start address of the memory to be allocated (return start address), calculating a start address (an object start address), at which the object is to be aligned, by adding a random value selected randomly, to the return start address, and aligning and positioning the object from the object start address.

According to an aspect of an embodiment, the method may further include determining, based on the allocation-requested memory size and the return start address, whether the memory alignment for the object is randomized without fixedly starting the memory alignment from a multiple of 4 or a multiple of 8, between the returning of the return start address by the heat allocator and the calculating of the object start address. If the memory alignment for the object is determined to be randomized, the object start address may be calculated, and, if the memory alignment for the object is determined not to be randomized, the return start address may be determined to be the object start address and the object may be aligned and positioned from the object start address.

According to an aspect of an embodiment, the determining of, based on the allocation-requested memory size and the return start address, whether the memory alignment for the object is randomized may include determining the memory alignment not to be randomized, if at least a part of the memory, which is allocated based on the allocation-requested memory size and the return start address, is included in a preset specific memory area (avoidance area), and otherwise, determining the memory alignment to be randomized.

According to an aspect of an embodiment, the avoidance area may be set to an area including at least one of a boundary of a cache memory or a page boundary of the memory.

According to an aspect of an embodiment, the random value selected randomly, may be selected as a value in a specific range (random value selection range), and the allocation-requested memory size may be a value obtained by adding a maximum value of the random value selection range to a memory size for specifying the object.

According to an aspect of an embodiment, the method may further include calculating a new object start address by repeatedly adding the random value to the object start address until the added object start address is not the multiple of 4 or 8, when the added object start address is the multiple of 4 or 8, the added calculated object start address is determined to be the new object start address, between the calculating of the object start address and the aligning and the positioning of the object, and aligning and positioning the object from the new object start address

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 2 is a drawing illustrating a procedure of randomizing memory alignment, according to an embodiment of the inventive concept;

FIGS. 5A and 5B illustrate a probability of mitigating a heap exploit is increased when memory alignment randomization, in which memory alignment is not maintained, is implemented, according to an embodiment of the inventive concept;

FIG. 6 illustrates a debugging screen showing the failure of a heap exploit when memory alignment randomization is implemented, according to an embodiment of the inventive concept;

FIG. 7 illustrates a debugging screen showing the failure of a heap exploit when memory alignment randomization according to an embodiment of the inventive concept is applied to the heap exploit which occurs in Internet explorer;

FIG. 8 is a drawing illustrating memory access instructions used in a micro-benchmark test for memory alignment randomization, according to an embodiment of the inventive concept;

FIGS. 9A to 9G are graphs illustrating times (seconds) taken to execute test instruction sets in mutually different Intel CPUs;

FIG. 10 is a view illustrating a speed degradation ratio in specific unaligned memory access;

FIG. 11 illustrates a test result showing slowdown in a function of memcpy( ) when the unaligned memory is processed;

FIG. 12 illustrates benchmark results in aligned memory access according to the related art and unaligned memory access according to an embodiment of the inventive concept; and FIG. 13 illustrates a benchmark performance difference of a Javascript engine in Internet Explorer before and after memory alignment randomization is performed according to an embodiment of the inventive concept.

DETAILED DESCRIPTION

Figure 1:
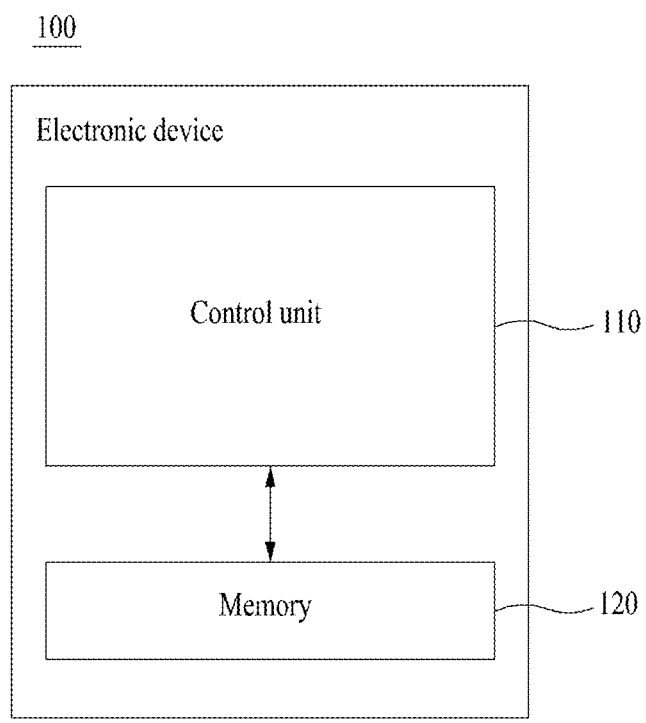
FIG. 1 illustrates an electronic device which performs a procedure of randomizing memory alignment, according to an embodiment of the inventive concept.

Hereinafter, embodiments of the inventive concept will be described in detail with reference to the accompanying drawings. Terms and words used in the specification and the claims shall not be interpreted as commonly-used dictionary meanings, but shall be interpreted as to be relevant to the technical scope of the inventive concept based on the fact that the inventor may properly define the concept of the terms to explain the inventive concept in best ways. Accordingly, the embodiments and the configurations depicted in the drawings are illustrative purposes only and do not represent all technical scopes of the embodiments, so it should be understood that various equivalents and modifications may exist at the time point of filing this application.

FIG. 1 illustrates an electronic device which performs a procedure of randomizing memory alignment, according to an embodiment of the inventive concept.

An electronic device 100 may include a control unit 110. In addition, the electronic device 100 may further include a memory 120.

The control unit 110 may manage elements of the electronic device 100 and may execute a program or an application used in the electronic device 100. In other words, the control unit 110 may be configured to execute a program or an application required to perform a procedure of randomizing memory alignment of the memory 120 and may be configured to process data and computations when randomizing the memory alignment. For example, the control unit 110 may be at least one processor (or central processing unit (CPU)) of the electronic device 100 or at least one core in the processor. The control unit 110 may access the memory 120 through a bus line.

The electronic device 100 may be a computing device including the control unit 110 such as a processor. For example, the electronic device 100 may be a personal computer (PC), a laptop computer, a tablet PC, the Internet of Things (IoT) device, a smart phone, or a wearable computer. The electronic device 100 may be a device including the control unit 110 which performs the procedure of randomizing the alignment of the memory 120.

The memory 120 may be a memory subject to the procedure of randomizing memory alignment according to an embodiment. The memory 120 may be a main memory of the electronic device 100. The memory 120 may allow access by the control unit 110. The memory 120 may include a volatile memory. For example, the memory 120 may include a random access memory (RAM).

The memory 120 may include a system memory of the electronic device 100 or the control unit 110. The system memory may include a stack area and a heap area.

Although not illustrated in FIG. 1, the electronic device 100 or the control unit 110 may further include a cache memory. For example, the electronic device 100 may further include a storage unit such as a non-volatile memory, or may further include an input/output device for the input and/or the output of data.

Figure 3:
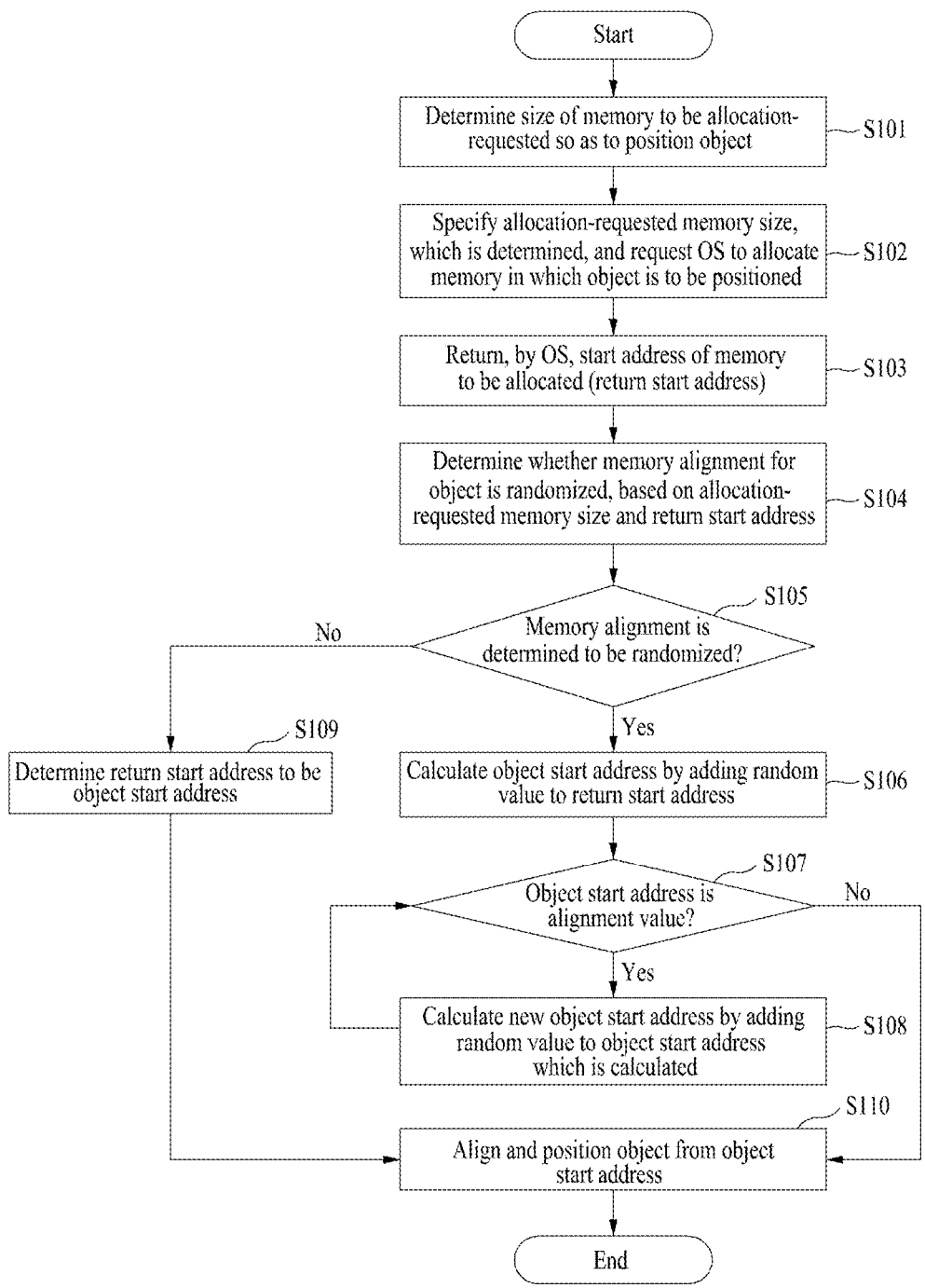
FIG. 3 is a flowchart illustrating a procedure of randomizing memory alignment, according to an embodiment of the inventive concept.

The procedure of randomizing memory alignment performed by the control unit 110 will be described in detail below with reference to FIGS. 2 to 13. FIG. 2 is a drawing illustrating a procedure of randomizing memory alignment, according to an embodiment of the inventive concept, and FIG. 3 is a flowchart illustrating a procedure of randomizing memory alignment, according to an embodiment of the inventive concept.

Hereinafter, a method of implementing the procedure of randomizing memory alignment, according to an embodiment of the inventive concept, will be described with reference to FIGS. 2 and 3. Operations (S101 to S110) will be performed by the control unit 110 which is described above with reference to FIG. 1.

Ideas according to an embodiment of the inventive concept will be implemented in various forms. Among them, there is a manner of modifying a memory allocator FIG. 2 illustrates that a memory allocation function of malloc( ) is redefined. When the memory allocation function of malloc( ) is called, a memory space is additionally allocated by sizeof(void*), which is a memory alignment unit desired by CPU, and a return pointer is randomly increased while ranging from 0 tosizeof(void*), thereby randomizing memory alignment. In this case, a function of policy( ) is called based on a memory position returned from the function of malloc( ) and a requested memory size to define a policy regarding whether memory alignment randomization is applied or not.

The issues on the performance of the memory alignment randomization will be described later, and the security of the memory alignment randomization will be first described immediately below. According to analysis results of recent cases (CVE-2016-5129, CVE-2013-2729, CVE-2016-1857, CVE-2012-4792, CVE-2013-0025, and CVE-2015-2411) of heap exploits that have been serious threats to popular software such as Google Chrome, Internet Explorer, Acrobat Reader and Safari, mitigation techniques of the memory alignment randomization of heap objects are easily bypassed in most cases. Regarding the core reason for the bypass of the mitigation techniques, an attacker may easily predict that a memory start address of a memory object is aligned even though the position of the memory object is randomized. Hereinafter, the procedure of randomizing memory alignment according to an embodiment of the inventive concept will be described with reference to the flowchart illustrated in FIG. 3.

First, the control unit 110 determines the—size (allocation-requested memory size) of a memory area to be allocation-requested so as to position an object (S101). The term 'object' refers to a set of data. In other words, an object area refers to an area in which the object, which is the set of the data, is positioned in the memory. The data may include a memory address value and a start address of a function which is called.

The control unit 110 designates the allocation-requested memory size, which is determined, as a parameter, as described above, and requests a heap allocator to allocate a memory for positioning the object (S102). For example, in the C programming language, a function of malloc(size) may be used. The start address (return start address) of the memory to be allocated by the heap allocator is returned by the function of malloc (size) (S103).

Thereafter, the control unit 110 calculates a start address (object start address), at which an object is to be aligned, by adding a random value to the return start address (S106). Before operation S106 is performed, operations of determining whether the alignment of the object start address is performed in a randomization manner may be performed (S104 and S105). As illustrated in FIG. 2, the above operations are performed by calling a function of policy(Pointer, size). Determining whether the alignment of the object start address is performed in the randomization manner may refer to that the object start address is designed as a random value without limitation to the multiples of 4 or 8. In general, if the heap allocator (OS) is requested to dynamically allocate the memory through the function of malloc(size) or the like, the start address is returned as multiples of 4 or 8. Therefore, according to an embodiment of the inventive concept, the object start address may be determined to be a random value without the limitation to the multiples of 4 or 8 by adding a randomly selected value to the returned value as described above. This refers to memory alignment randomization according to an embodiment of the inventive concept.

However, in some cases, an address may be allocated without the randomization for the object. In other words, it may be preferred that the heap allocator (OS) uses the multiples of 4 or 8 as the start address without change. The determination of the case is performed by the function of policy(Pointer, size) illustrated in FIG. 2, or operations S104 and S105 illustrated in FIG. 3.

In other words, the control unit 110 determines, based on the allocation-requested memory size and the return start address, whether the memory alignment for an object is randomized without fixedly starting the memory alignment from the multiples of 4 or 8 (S104). If the control unit 110 determines the memory alignment not to be randomized, the control unit 110 determines the return start address, which is returned in operation S103, to be the object start address without change (S109) and aligns and positions the object from the object start address (S110). If the control unit 110 determines the memory alignment to be randomized (S105), the control unit 110 calculates the object start address by adding the randomly selected value to the return start address, which is returned in operation S103, (S106), and aligns and positions the object from the object start address (S110). In this case, the randomly selected value may be selected as a value in a specific range (random value selection range). The allocation-requested memory size in operation S102 is preferably a value obtained by adding the maximum value of the random value selection range to the memory size necessary for specifying the object.

Regarding that the control unit 110 determines whether the memory alignment is randomized (S104), according to one embodiment, if the allocated memory area is included in a preset specific memory area (avoidance area), the control unit 110 may determine the memory alignment not to be randomized, based on the allocation—requested memory size and the return start address. If the allocated memory area is not included in the avoidance area, the control unit 110 may determine the memory alignment to be randomized. In this case, the avoidance area may be a specific area of the memory in which a memory access speed is remarkably reduced, in the case that the object is positioned at a start address which is not the multiple of 4 or 8. For example, the avoidance area may be an area including the boundary of a cache memory or a page boundary of the memory. Regarding the issue that the memory access speed is remarkably reduced in the area including the boundary of the cache memory or the page boundary of the memory, description will be made later based on simulation results of FIGS. 9 to 12.

Meanwhile, as described above, if the memory alignment is determined to be randomized (S105), the object start address is calculated by adding the randomly selected value to the return start address, which is returned in operation S103, (S106), and the object is aligned and positioned from the object start address (S110). If necessary, the calculated object start address may be checked once more (S107 and S108).

In addition, after the object start address is calculated by adding the randomly selected value to the return start address (S106), if the object start address is the multiple of 4 or 8 (described as "alignment value" in FIG. 3), the randomly selected value is added to the calculated object start address until the calculated object start address becomes a number other than the multiple of 4 or 8, thereby repeating a procedure of calculating a new object start address. If the number other than the multiple of 4 or 8 is calculated, the number is finally determined to be the object start address, and the object is aligned and positioned from the object start address (S110). In other words, these are operations of preventing the object start address from being the multiple of 4 or 8.

Figure 4A:
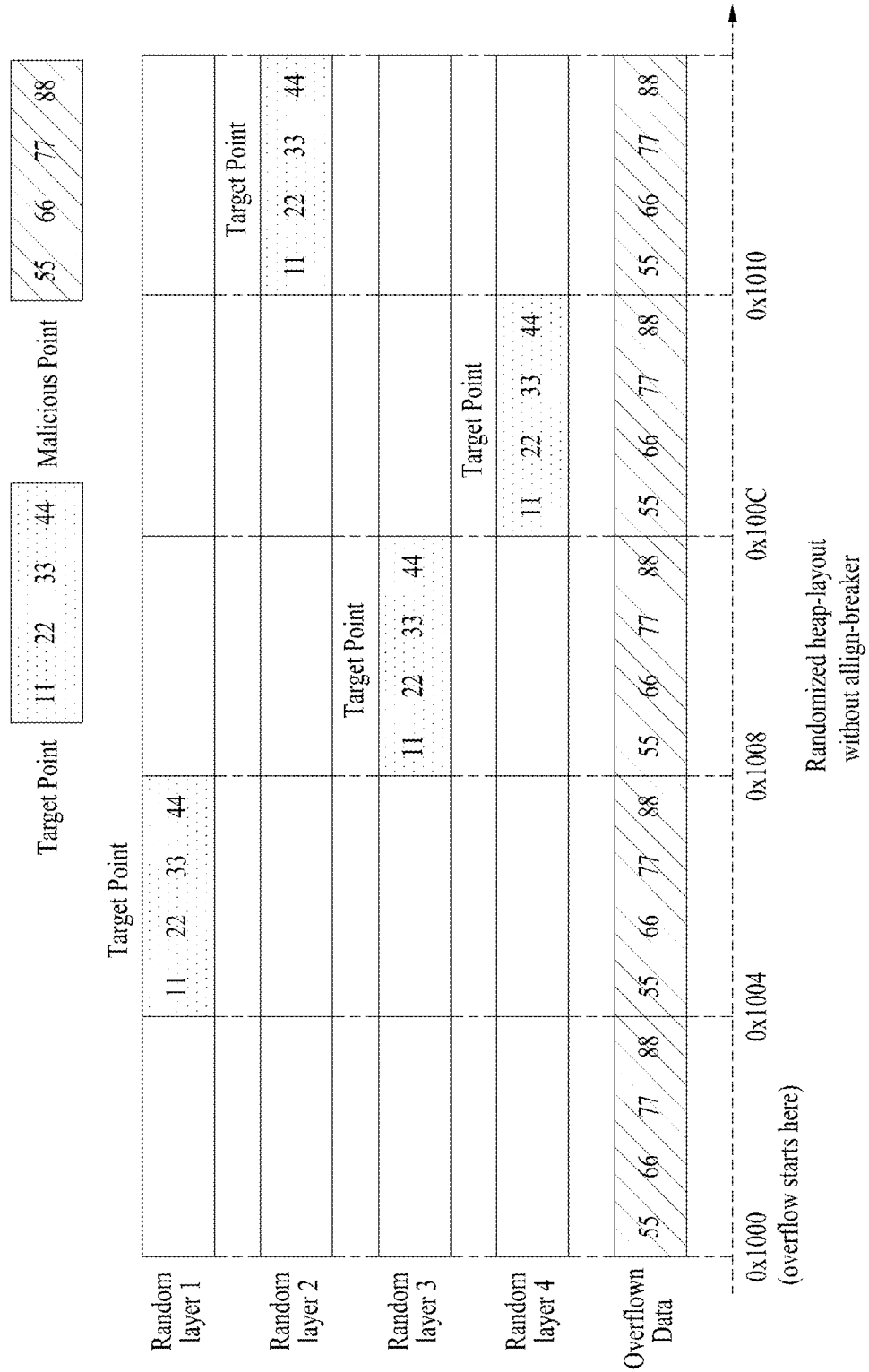
FIGS. 4A and 4B illustrate the case that memory alignment is maintained at a multiple of 4 in a conventional manner and memory alignment randomization that the memory alignment is not maintained, according to an embodiment of the inventive concept.
Figure 4B:
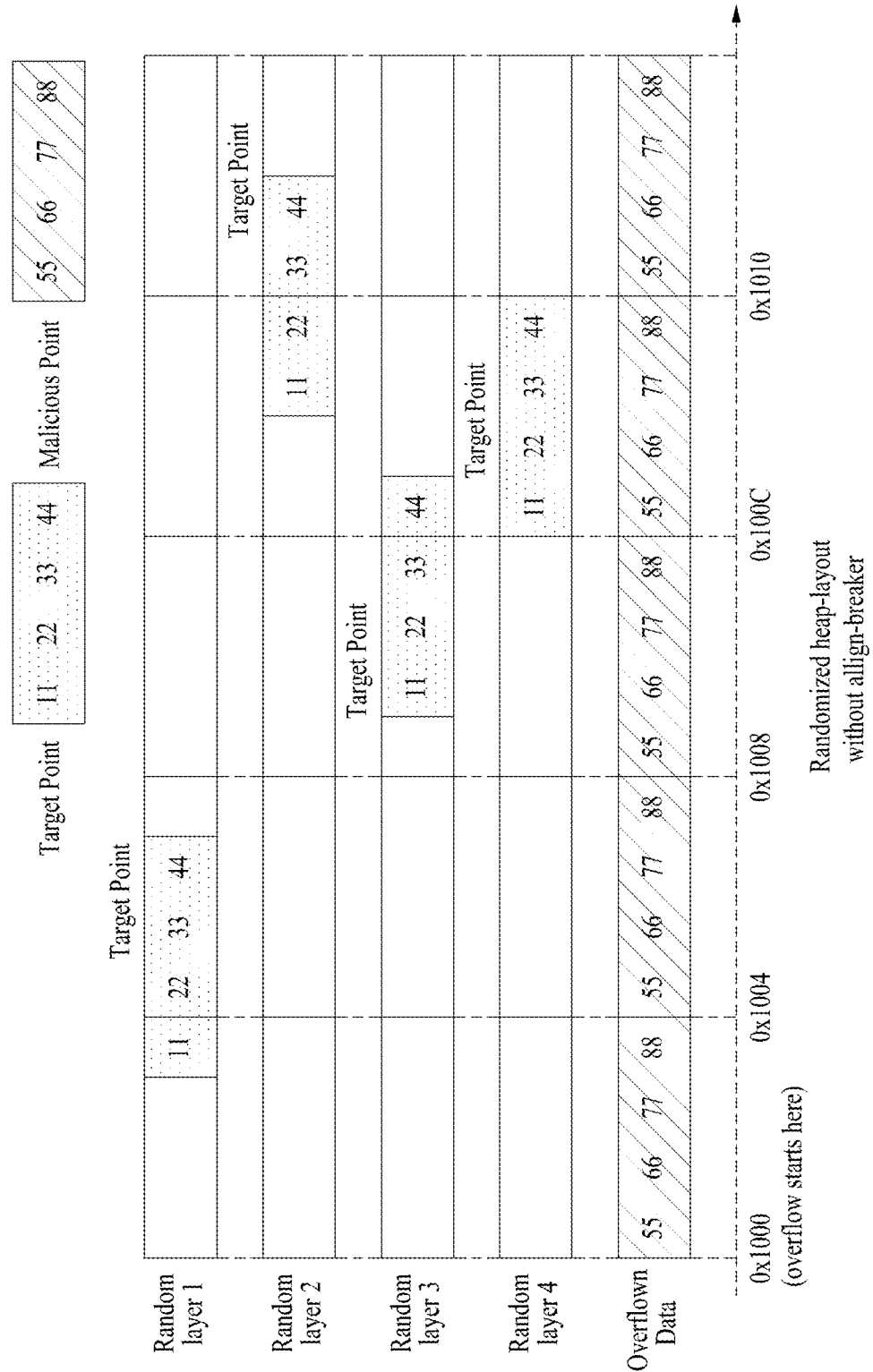

However, the above operations S107 and S108 may not be necessarily performed. In detail, even if a value calculated by adding a random value to the return start address, which is returned by the heap allocator (OS) in operation S103, is the multiple of 4 or 8, the value may be used as the object start address without change. If the multiple of 4 or 8 is completely avoided, the attacker may recognize, through repeated attacks, that the multiple of 4 or 8 is not used as the start address. Accordingly, the attacker may use an address other than the multiple of 4 or 8 and thus the success probability of an attack may be increased. Accordingly, even if the value calculated by adding the random value to the return start address, which is returned by the heap allocator (OS) in operation S103, is the multiple of 4 or 8, if the value is used as the object start address without change, the success probability of the attack may be significantly lowered. Actually, a function intended by the attacker may be called in the final stage with a lower success probability of the attack, which will be described later. Hereinafter, a conventional mitigation method of a heap exploit and a principle of foiling a heap exploit based on the memory alignment randomization according to an embodiment of the inventive concept described with reference to FIGS. 2 and 3, will be described through simplification with reference to FIGS. 4A and 4B. FIGS. 4A and 4B illustrate the case that memory alignment is maintained at a multiple of 4 in a conventional manner and memory alignment randomization that the memory alignment is not maintained, according to an embodiment of the inventive concept.

FIG. 4A illustrates the situation that an attacker wants to change a 4-byte pointer of "11 22 33 44" (all addresses are expressed in hexadecimal) into a pointer of "55 66 77 88" through a memory corruption exploit. In FIG. 4A, even if the pointer of "11 22 33 44" is randomly present in four forms different from each other between an address of 0x1000 and an address of 0x1010, when the attacker corrupts all memories in the boundary in which an object exists as illustrated in the fifth row at the lower portion of FIG. 4A, the attacker succeeds the exploit with the probability of 100%.

However, as illustrated in FIG. 4B, when the 4-byte memory alignment is randomized, the success probability of a memory exploit remains only 25% regardless of memory corruption manners by the attacker. The technical spirit of the inventive concept of randomizing the memory alignment instead of the relative position of the memory is not bypassed by an exploit based on a wide memory area (heap spay attack).

Figure 5B:
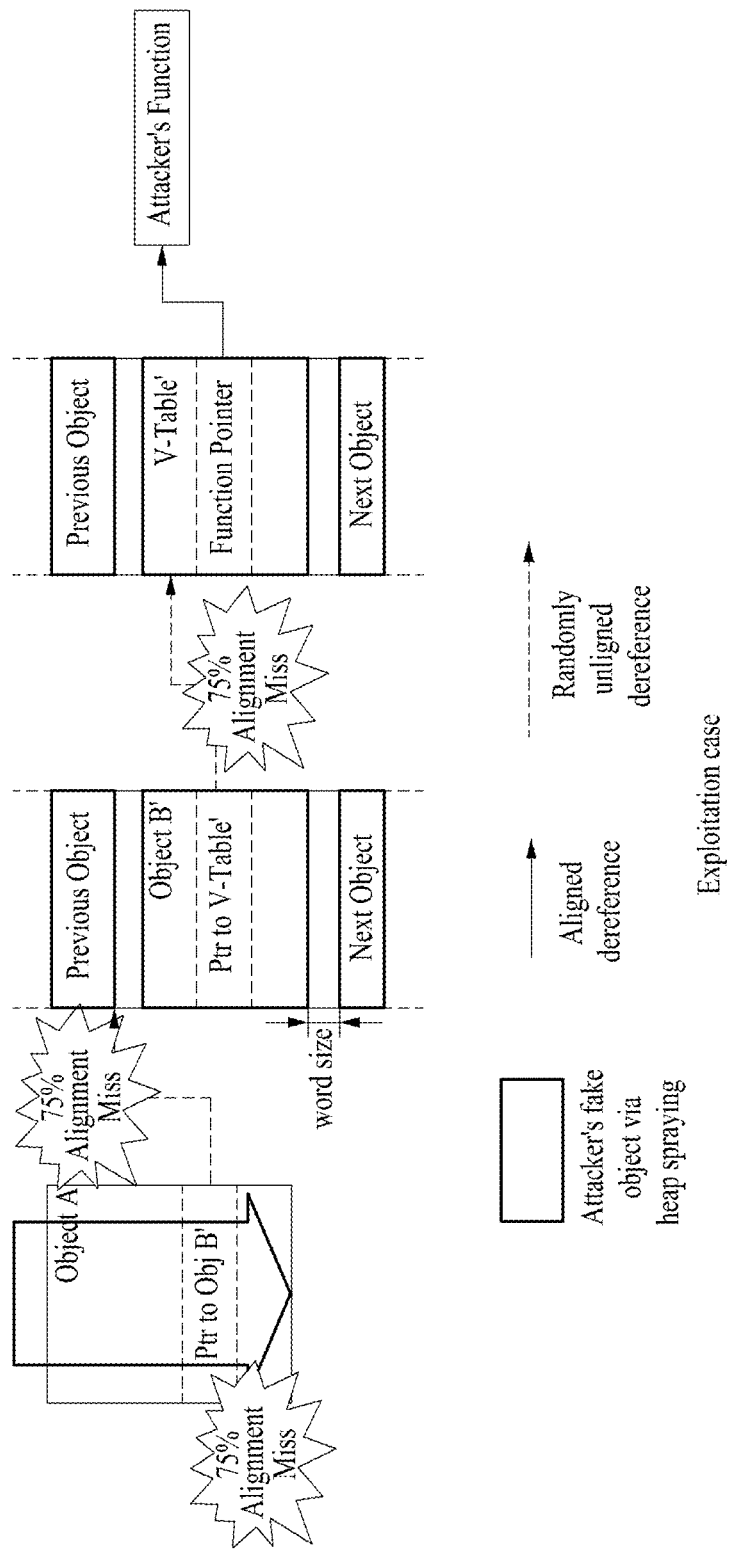
Figure 9A:
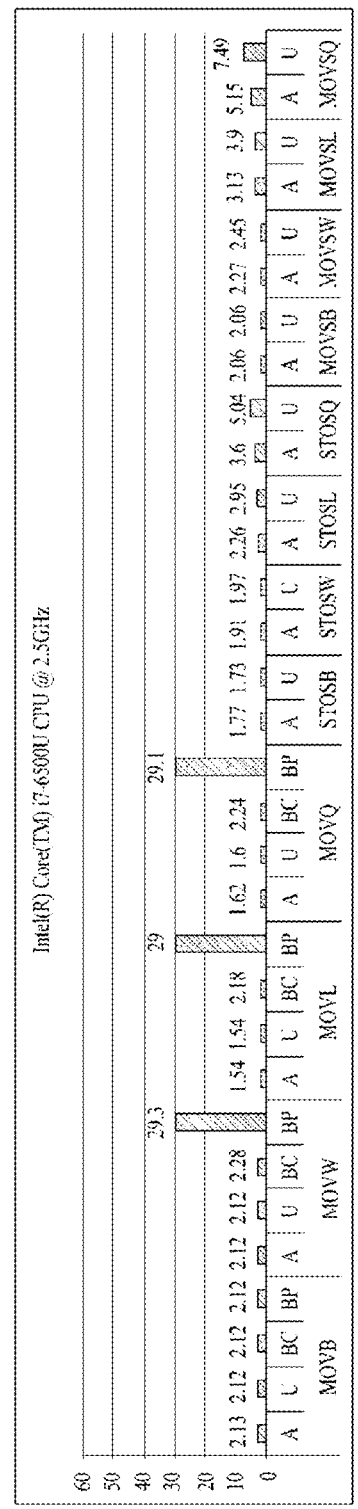
FIGS. 9A to 9G illustrate the above test results.
Figure 9B:
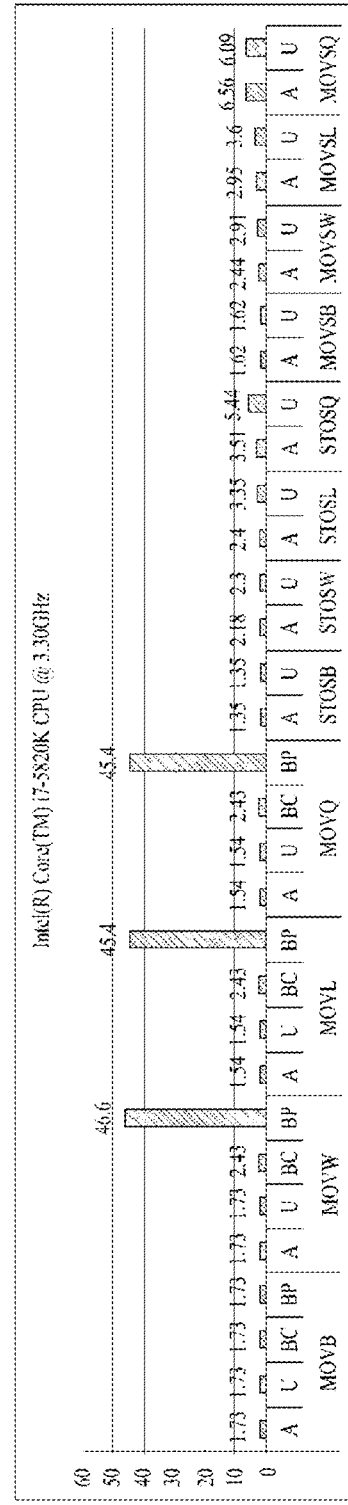
Figure 9C:
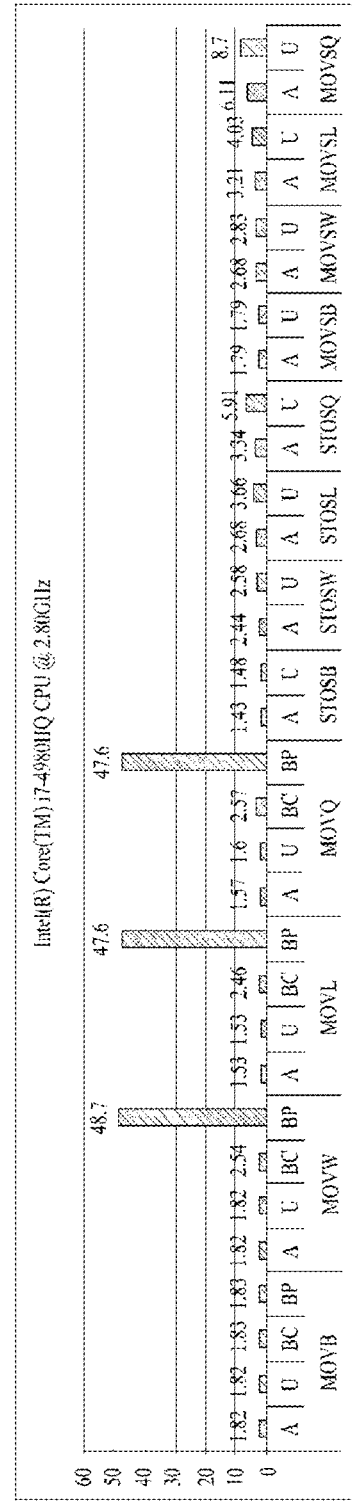
Figure 9D:
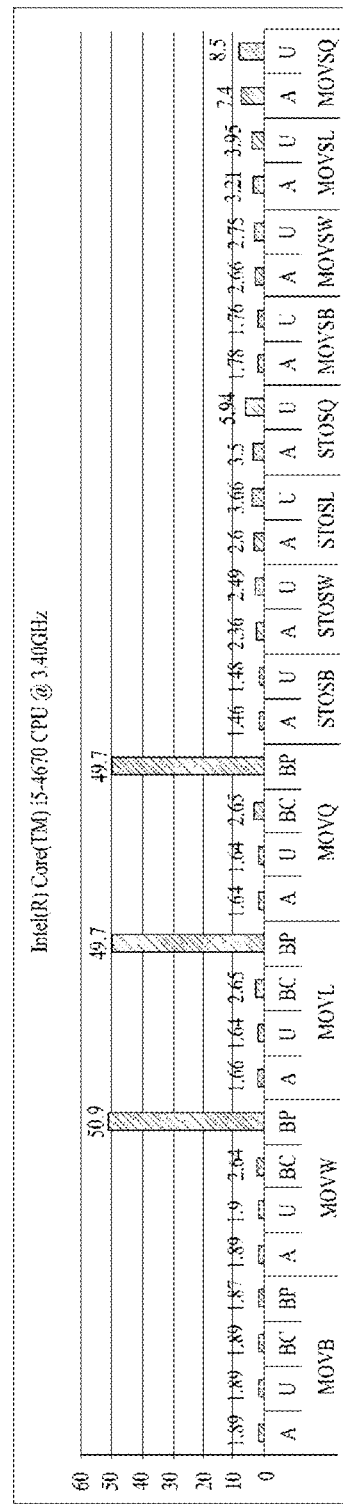
Figure 9E:
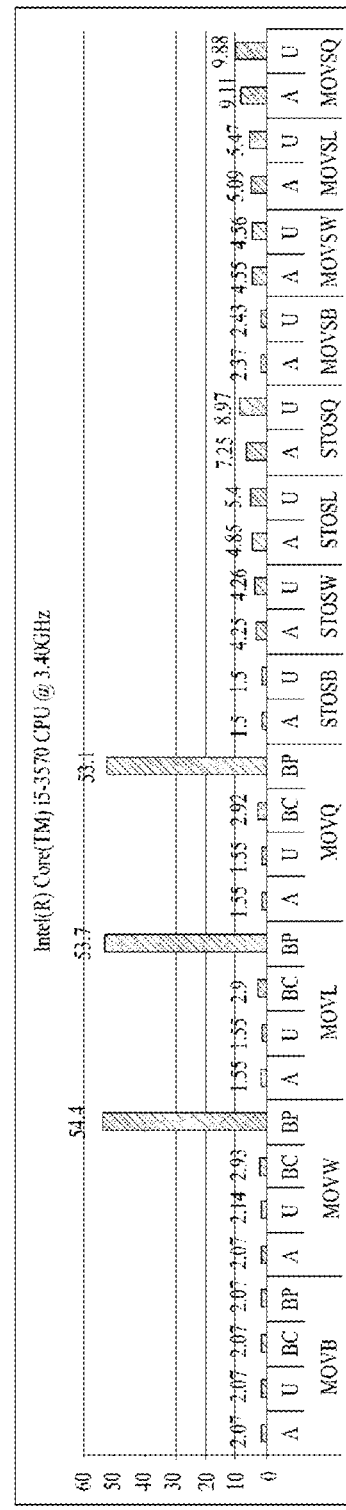
Figure 9F:
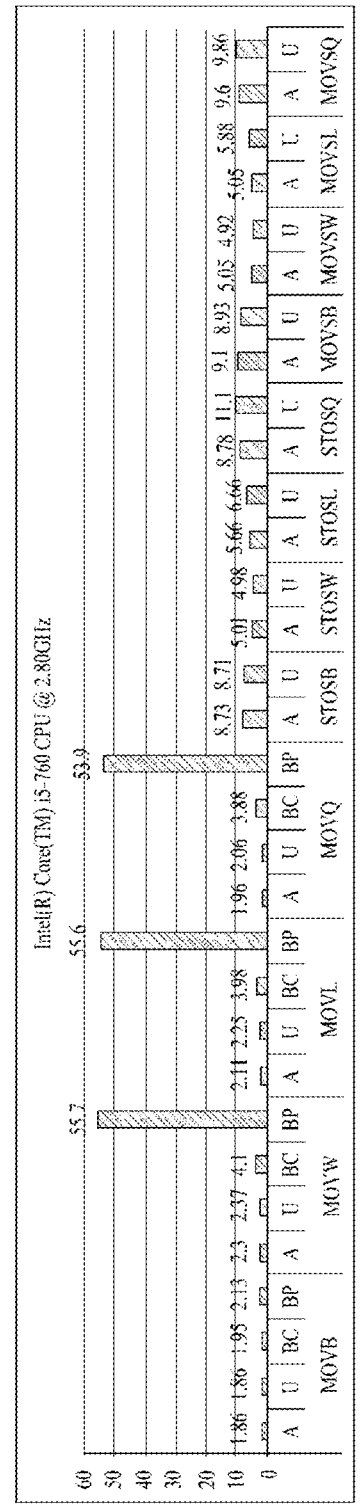
Figure 9G:
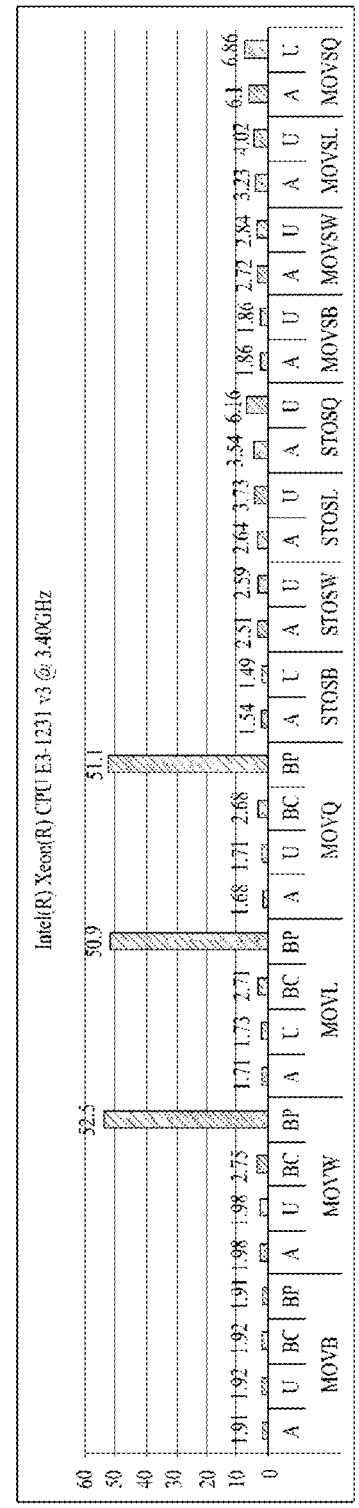

In the case of the randomization of the memory alignment described above with reference to FIG. 4B, the success probabilities of these memory exploits seem to be 25% (in a 32-bit system) or 12.5% (in a 64-bit system). However, actually, the success probability of the memory exploit may be a value much lower that the above value. In other words, when recent various common vulnerabilities and exposure (CVE) cases of the heap exploit are analyzed, it may be recognized that the probability of foiling the heap exploit has been exponentially increased. This is because data corruption has to occur consecutively several times in most exploit processes. The details thereof will be described below with reference to FIGS. 5A and 5B. FIGS. 5A and 5B illustrate that the probability of foiling the heap exploit is increased when the memory alignment randomization, in which memory alignment is not maintained, is implemented, according to an embodiment of the inventive concept.

In most cases of the heap exploit, the attacker aims at making fake objects in a memory and allowing a corrupted pointer to exactly point out the fake objects through vulnerabilities. FIGS. 5A and 5B illustrate a situation in which an object A is faked. The attacker faking the object A has to position a fake object B referenced by the object A into a memory (this is because, if a real object B is used, program is not corrupted). In addition, the attacker has to induce the use of a fake V-table object after the attacker prepares the fake V-table object to be employed by the object B. Finally, when the program employs the fake V-table, an attacker's function is executed and thus the execution flow of the program is changed into a form desired by the attacker.

The most general technique of using a fake object is to use a heap spray technique. In other words, many identical objects are repeatedly created in the memory. In this case, even if heap randomization is applied to the memory, the attacker may approximately predict an address range in which the objects are collected even though the attacker does not know exact memory positions of the objects. For example, when it is assumed that the attacker creates 100,000 fake objects B, it is predicted with higher probability under a current heap randomization policy that relevant objects are present between addresses X to Y, based on the calculation of memory usage. In this case, on the assumption that objects always maintain the memory alignment (a memory address on a four or eight-byte basis as described above), the start address of a fake object may be exactly predicted with a higher probability as illustrated in FIG. 5A.

However, in the case that the memory alignment randomization according to an embodiment of the inventive concept is applied as illustrated in FIG. 5B, since the memory alignment randomization is not affected by the change in probability resulting from the heap spray, the memory alignment randomization is not affected by such an attack. Accordingly, whenever the fake object needs to be used, the attack is caused to be failed with a specific probability.

Figure 6:
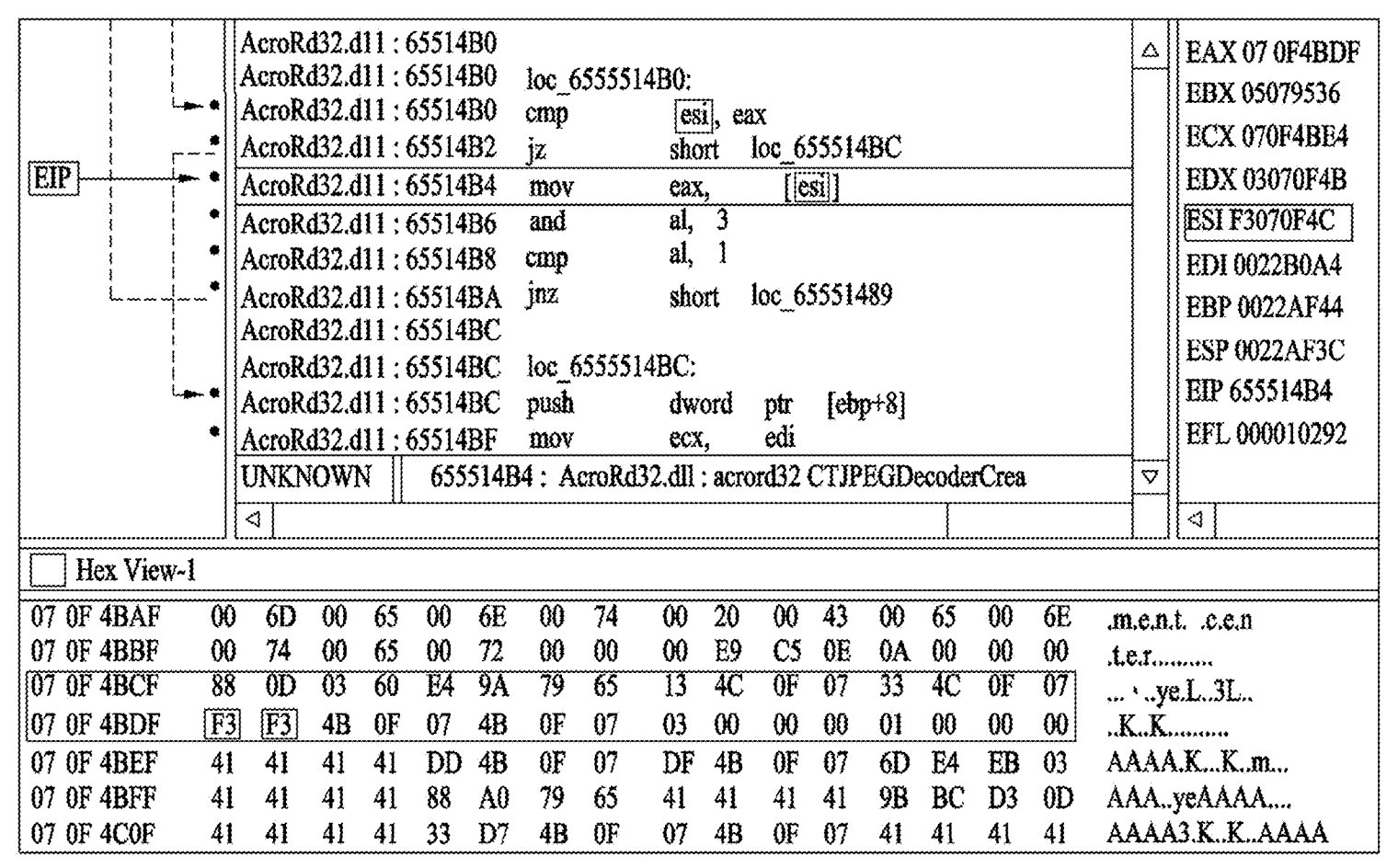

The effect of memory alignment randomization may be verified several times based on actually commercialized CVE attack cases. FIG. 6 illustrates the effect of the memory alignment randomization against a heap exploit (CVE-2013-2729) existing in Adobe Acrobat Reader, which is the most famous PDF editor, as described below. FIG. 6 illustrates a debugging screen showing the failure in the heap exploit when the memory alignment randomization is implemented according to an embodiment of the inventive concept.

FIG. 6 illustrates an IDA debugging screen showing proof-of-concept (PoC) codes (PDF document files) for CVE-2013-2729 when the memory alignment randomization is applied to an Acrobat Reader program, according to an embodiment of the inventive concept. As illustrated in FIG. 6, the program crashes while referencing an ESI register. In other words, as illustrated in FIG. 6, the value of the ESI register is 0xF3070F4C. This is because the fake object prepared by the attacker occurs the failure in referencing due to the memory alignment randomization and thus the value of the ESI register is unintentionally changed to 0xF3070F4C instead of 0x070F4C33 which is a value intended by the attacker. In the case that only conventional heap memory (heap area) randomization is applied instead of the memory alignment randomization according to an embodiment of the inventive concept, PoC codes operate with the success probability of about 100% to perform arbitrary instructions issued by the attacker. In the case that the memory alignment randomization according to an embodiment of the inventive concept is applied, the exploit codes crash with the probability of about 100% as described above and thus the instruction issued by the attacker is not performed. Accordingly, the success probability of the exploit is dropped to about 0% (the program does not crash under the situation that there is no exploit). FIG. 7 illustrates a debugging screen showing the failure of a heap exploit when memory alignment randomization according to an embodiment of the inventive concept is applied to the heap exploit which occurs in Internet explorer.

As illustrated in FIG. 7, an instruction in the address of 0x74CE6805 crashes when the instruction references a memory corresponding to a value of an ESI register. It may be recognized from FIG. 7 that the value of the ESI register is 0xFECA0000. The PoC codes (html page) of the relevant exploit change the value of the ESI register to 0xBEBAF-ECA. However, it may be recognized that the probability, in which the value of the ESI register exactly becomes 0xBE-BAFECA, is 25% due to the memory alignment randomization. In addition, on the assumption that the ESI is exactly controlled as intended by the attacker, an instruction of "call" in the address of 0x74CE6809 has to be controlled to control the execution flow of the program. To this end, a value present in a memory indicated by EAX+0x170 has to be exactly controlled. In order to finally control the instruction of "call" from the control of the ESI, two steps of referencing fake objects have to be performed after the ESI is controlled. This means that the probability of performing the instruction of "call" intended by the attacker is significantly dropped to (0.25)3.

In addition to CVE-2013-2729 and CVE-2013-0025, the success probability of PoC codes of exploiting main software, such as Google Chrome, Apple Safari, or the like, approximates 0% due to the memory alignment randomization. Although the memory alignment randomization produces an excellent effect in security to foil the heap exploit, performance may be degraded in the structure of an existing central processing unit (CPU) as described above. However, the performance degradation of the latest complex instruction set architecture (CISC) CPU is changed in unaligned memory access, which is different from that of the past CPU.

The CISC CUP has to fundamentally perform unaligned memory access because all instructions of a reduced instruction set computer (RISC) architecture are configured in the size of multiples of 4, but the instructions of the CISC architecture is not configured in the size of multiples of 4). Accordingly, preventing the performance degradation in the unaligned memory access is important in the CISC CPU. In the case of a micro-architecture (Haswell, Skylake, or the like) after i7 Nehalem in Intel, when the unaligned memory access occurs inside a cache line, performance degradation is not caused. FIG. 8 is a drawing illustrating memory access instructions used in a micro-benchmark test for memory alignment randomization, according to an embodiment of the inventive concept.

According to an embodiment of the inventive concept, as concerns about performance degradation in a CPU memory access speed are increased, relevant performance tests have been performed in many cases. FIG. 8 illustrates representative instructions which are selected in an Intel instruction set and used in the memory access. In general, several instructions are simultaneously inputted into a CPU pipeline and executed. Accordingly, when an instruction making the worst performance is present in the pipeline, lowering the execution speed of an instruction, which is more rapidly executed, may not be sufficiently recognized. In the case of Intel, generally, a pipeline having about 15 stages is configured. In the performance test according to an embodiment of the inventive concept, to make the worst pipeline and to confirm the theoretical worst result from the unaligned memory access, 48 unrolled instruction sets are configured, and the counter value is set to 256 in the case of REP prefix-based instructions.

After the worst pipeline is configured as illustrated in FIG. 8, a time taken to repeat a relevant instruction set 134,217,728 times is measured by several IntelCPUs. FIGS. 9A to 9G illustrate the above test results. FIGS. 9A to 9G are graphs illustrating times (seconds) taken to execute test instruction sets in mutually different Intel CPUs.

In the graphs, alphabet signs are defined as follows.
A: Access time to memory completely aligned.
U: Access time to unaligned memory inside cache.
BC: Access time to unaligned memory at cache boundary.
BP: Access time to unaligned memory at page boundary.

Actually, as a test result, there is no difference between the unaligned memory access and the aligned memory access inside the cache in the case of the latestCPU. However, when the unaligned memory access occurs at the cache boundary, a speed is reduced by about 50% on average. When the unaligned memory access occurs at the page boundary, the speed is reduced by about 2500%. However, a probability, in which arbitrary memory access occurs at the cache boundary, is about 1/64, and a probability, in which the memory access occurs at the page boundary, is about 1/4096. Accordingly, an expectation value of performance degradation may be calculated with respect to each instruction set related to the arbitrary memory access by exactly taking the probabilities into the consideration. In this case, the results are obtained as shown in a table of FIG. 10. FIG. 10 is a view illustrating a speed degradation ratio in specific unaligned memory access.

According to a gist of a test result illustrated in FIG. 10, the latest Intel CPU does not uniformly cause performance degradation with respect to all unaligned memory access. In other words, the performance degradation is not caused with respect to about 99% of unaligned memory accesses, but exceptionally caused with respect to 1% of unaligned memory accesses.

The cache boundary or the page boundary may be simply calculated based on the starting position of memory allocation and the size of a memory to be allocated. Therefore, according to an embodiment of the inventive concept, it is possible for the function of policy( ) which is described in the procedure of FIG. 2, to randomize memory alignment while not causing performance degradation by avoiding the unaligned memory access occurring at the cache or page boundary based on the above information.

Although performance tests have been described at a CPU instruction level until now, application program interfaces (APIs) are actually used for memory access. A function of memcpy( ), which is one of an application program interface (API), is analyzed. According to the analysis result of the function of memcpy( ), it may be recognized that, in the latest implements of the function of memcpy( ), even if an unaligned memory is received as an argument of the memcpy( ), the memory is forcibly aligned and copied. Accordingly, it may be recognized that the performance degradation caused by the memory alignment randomization is not shown in the function of memcpy( ). FIG. 11 illustrates a test result showing slowdown in the function of memcpy( ) when the unaligned memory is processed.

FIG. 11 illustrates a test result for slowdown when an unaligned memory is transferred to the function of memcpy( ) under environments of various OSs, various compilers, and various CPUs. As illustrated in FIG. 11, since the function of memcpy( ) performs self-alignment for unaligned memory addresses and processes the unaligned memory addresses to utilize an SSE instruction, the performance degradation of less than 1% is shown in the function of memcpy( ) However, the old-fashioned implementation of the function of memcpy( ) in FreeBSD and the like, employ the worst pipeline instead of SSE which is the latest Intel's instruction set. Accordingly, theoretically, the worst performance is shown. FIG. 12 illustrates benchmark results in aligned memory access according to the related art and unaligned memory access according to an embodiment of the inventive concept. FIG. 13 illustrates a benchmark performance difference of a Javascript engine in Internet Explorer before and after the memory alignment randomization is performed according to an embodiment of the inventive concept.

FIGS. 12 and 13 illustrate a performance difference made based on SPEC2006, which is a commercial benchmark framework, and SunSpider, which is a benchmark used to measure the performance of a Javascript engine in a web browser, between the two cases that the memory alignment randomization is not applied and applied. Although most test results show performance degradation of less than 1%, somewhat higher performance degradation is shown in some unusual cases.

All performance tests up to now have not employed the function of policy ( ) with respect to the cache boundary and page boundary in the procedure. If the function of policy ( ) is differently applied to the cache and page boundaries, all performance tests will show performance degradation approximating to 0%, as demonstrated by benchmark tests at the instruction level. Until now, ideas of the inventive concept and issues on the security and the performance of the ideas have been described. The compatibility with software development standards is not described according to an embodiment of the inventive concept. The idea according to an embodiment of the inventive concept is memory alignment randomization in a heap area. Some pieces of software have been developed on the premise that the heap area is always aligned. In this case, the premise of the software development is disappeared, and thus a program may erroneously operate. As an example, in the case of a Page Renderer module in the Chrome Web browser, parts of the program may be implemented with the premise that a heap area is always aligned. In addition, parts of the FireFox web browser and Libre Office products have similar problems. However, there is no problem when Linux basic instructions, domestic software such as Hancom Office, Acrobat Reader of Adobe, and Internet Explorer of Microsoft are compatible with the inventive concept.

Although the standards of a heap area allocation API, such as the function of malloc( ), do not require the return of an aligned memory actually, all implementations of the function of malloc( ) are designed in such a manner that a memory is aligned in reality. Accordingly, a developer may develop a program by regarding the memory alignment as a standard. If an aligned memory is required, the developer has to use an API such as a function of aligned_malloc( ) which is specified in an API specification. If current software having no compatibility with the inventive concept aims at producing the same effect as that of the inventive concept, the software has to be developed without employing the premise that a heap area is aligned.

The premise that the heap area is aligned is used to prevent a memory space of 7 bits from being wasted as a memory space of 1 byte is used when only a memory space of 1 bit is required, and to improve the convenience of software development. However, the premise is only used to slightly save a memory usage and to improve the convenience of the software development, and is not related to the core operations of the software.

A company that requires the application according to an embodiment of the inventive concept may be a software related company such as Microsoft, Google, or Adobe. The market value of one heap exploit against software that these large corporations put on the market reaches tens of millions won. Accordingly, when the heap exploit is foiled according to an embodiment of the inventive concept, the economic value of the inventive concept may be potentially high.

As described above, according to embodiments of the inventive concept, the heap exploits may be powerfully mitigated by aligning randomly obtained memory addresses instead of aligning memory addresses at multiples of 4 or 8 when the memory alignment for objects inside a heap area is performed.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of randomizing memory alignment, the method comprising:
   providing a request including an allocation-requested memory size of a memory to a heap allocator;
   requesting the heap allocator to allocate the memory to have the allocation-requested memory size;
   returning, by the heap allocator, a return start address of the memory to be allocated;
   calculating an object start address at which an object is to be aligned within the memory by adding a random value selected randomly to the return start address;
   aligning and positioning the object starting from the object start address; and
   determining, based on the allocation-requested memory size and the return start address, whether the memory alignment for the object is randomized without fixedly starting the memory alignment from a multiple of 4 or a multiple of 8, between the returning of the return start address by the heap allocator and the calculating of the object start address,
   wherein, in response to the memory alignment for the object being determined to be randomized, the object start address is calculated as a random value obtained from a range of possible random values including the multiple of 4 and the multiple of 8 to reduce a success probability of a memory heap exploit attack, and
   wherein, in response to the memory alignment for the object being determined not to be randomized, the return start address is determined to be the object start address and the object is aligned and positioned from the object start address.

2. The method of claim 1, wherein the determining of, based on the allocation-requested memory size and the return start address, whether the memory alignment for the object is randomized includes:
   determining whether at least part of the memory, which is allocated based on the allocation-requested memory size and the return start address, is included in a preset specific memory avoidance area;
   in response to determining that at least the part of the memory is included in the preset specific memory avoidance area, determining the memory alignment is not to be randomized; and otherwise, determining the memory alignment is to be randomized.

3. The method of claim 2, wherein the avoidance area is set to an area including at least one of a boundary of a cache memory and a page boundary of the memory.

4. The method of claim 1, wherein the range is a predefined specific range, and
 wherein the allocation-requested memory size is a value obtained by adding a maximum value of the specific range to a memory size for specifying the object.

\* \* \* \* \*